(12) United States Patent
Moriyama (10) Patent No.: US 11,724,542 B2
(45) Date of Patent: Aug. 15, 2023

(54) TIRE COMPRISING A RUBBER COMPOSITION

(71) Applicant: COMPAGNIE GENERALE DES ETABLISSEMENTS MICHELIN, Clermont-Ferrand (FR)

(72) Inventor: Masahiko Moriyama, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 409 days.

(21) Appl. No.: 16/651,591

(22) PCT Filed: Sep. 28, 2017

(86) PCT No.: PCT/JP2017/035165
§ 371 (c)(1),
(2) Date: Mar. 27, 2020

(87) PCT Pub. No.: WO2019/064407
PCT Pub. Date: Apr. 4, 2019

(65) Prior Publication Data
US 2020/0254817 A1     Aug. 13, 2020

(51) Int. Cl.
*B60C 1/00* (2006.01)
*B60C 11/13* (2006.01)
(Continued)

(52) U.S. Cl.
CPC .......... *B60C 1/0016* (2013.01); *B60C 1/0025* (2013.01); *B60C 11/1346* (2013.01); *C08F 36/06* (2013.01); *C08F 36/08* (2013.01); *C08K 3/04* (2013.01); *C08K 3/36* (2013.01); *C08K 5/0016* (2013.01); *C08K 5/0041* (2013.01); *C08L 7/00* (2013.01)

(58) Field of Classification Search
CPC . B60C 1/0016; B60C 1/0025; B60C 11/1346; C08F 36/06; C08F 36/08; C08L 7/00; C08K 3/04; C08K 3/36; C08K 5/0041
See application file for complete search history.

(56) References Cited

U.S. PATENT DOCUMENTS 5,094,777 A * 3/1992 DiPietro .................. C08J 3/226
                                                      524/845
6,048,923 A    4/2000 Mabry et al.
(Continued)

FOREIGN PATENT DOCUMENTS

CN      102964639 A     3/2013
CN      103998251 A     8/2014
(Continued)

OTHER PUBLICATIONS

English language translation of KR 20110061113A, pp. 1-10, Jun. 9, 2022.*
(Continued)

*Primary Examiner* — Alexander C Kollias
(74) *Attorney, Agent, or Firm* — Venable LLP (57) ABSTRACT

A tire comprises a fluorescent rubber composition based on at least an elastomer matrix, a reinforcing filler comprising between 0 and 50 phr of carbon black and between 2.5 and 15 phr of a fluorescent pigment.

13 Claims, 1 Drawing Sheet

(51) Int. Cl.
*C08F 36/06* (2006.01)
*C08F 36/08* (2006.01)
*C08K 3/04* (2006.01)
*C08K 3/36* (2006.01)
*C08K 5/00* (2006.01)
*C08L 7/00* (2006.01)

(56) References Cited

U.S. PATENT DOCUMENTS

| | | |
|---|---|---|
| 6,414,061 B1 | 7/2002 | Cruse et al. |
| 6,774,255 B1 | 8/2004 | Tardivat et al. |
| 6,849,754 B2 | 2/2005 | Deschler et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,488,768 B2 | 2/2009 | Tardivat et al. |
| 7,491,767 B2 | 2/2009 | Durel et al. |
| 7,510,670 B2 | 3/2009 | Chaves et al. |
| 8,492,475 B2 | 7/2013 | Araujo da Silva et al. |
| 8,957,155 B2 | 2/2015 | Seeboth et al. |
| 9,010,393 B2 | 4/2015 | Araujo da Silva et al. |
| 9,962,996 B2 | 5/2018 | Abad et al. |
| 2004/0051210 A1 | 3/2004 | Tardivat et al. |
| 2004/0084120 A1 | 5/2004 | Arnold et al. |
| 2004/0129360 A1 | 7/2004 | Vidal et al. |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2005/0245753 A1 | 11/2005 | Cruse et al. |
| 2007/0228322 A1 | 10/2007 | Chaves et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2010/0145089 A1 | 6/2010 | Mignani et al. |
| 2011/0152458 A1 | 6/2011 | Araujo da Silva et al. |
| 2011/0294953 A1 | 12/2011 | Seeboth et al. |
| 2012/0245270 A1* | 9/2012 | Blanchard .............. C08K 5/053 524/388 |
| 2014/0311641 A1* | 10/2014 | El-Harak ............ B60C 11/1346 152/209.18 |
| 2018/0057665 A1* | 3/2018 | Miyazaki ................ C08K 3/22 |

FOREIGN PATENT DOCUMENTS

| | | | |
|---|---|---|---|
| CN | 104017247 A | 9/2014 | |
| CN | 104589929 A | 5/2015 | |
| EP | 0 510 550 A1 | 10/1998 | |
| JP | 59-11903 A | 1/1984 | |
| JP | 2014-65879 A | 4/2014 | |
| JP | 2014-65880 A | 4/2014 | |
| JP | 2014-65881 A | 4/2014 | |
| JP | 2014065881 A * | 4/2014 | .............. C08L 21/10 |
| JP | 2015-500176 A | 1/2015 | |
| KR | 10-2004-0017170 A | 2/2004 | |
| KR | 10-2011-0061113 A | 6/2011 | |
| KR | 10-2014-0106682 A | 9/2014 | |
| WO | 97/36724 A2 | 10/1997 | |
| WO | 99/09036 A1 | 2/1999 | |
| WO | 99/16600 A1 | 4/1999 | |
| WO | 02/30939 A1 | 4/2002 | |
| WO | 02/31041 A1 | 4/2002 | |
| WO | 02/083782 A1 | 10/2002 | |
| WO | 03/002648 A1 | 1/2003 | |
| WO | 03/002649 A1 | 1/2003 | |
| WO | 03/016387 A1 | 2/2003 | |
| WO | 2004/033548 A1 | 4/2004 | |
| WO | 2004/050391 A1 | 6/2004 | |
| WO | 2006/023815 A2 | 3/2006 | |
| WO | 2006/125532 A1 | 11/2006 | |
| WO | 2006/125533 A1 | 11/2006 | |
| WO | 2006/125534 A1 | 11/2006 | |
| WO | 2007/098080 A2 | 8/2007 | |
| WO | 2008/055986 A2 | 5/2008 | |
| WO | 2010/072685 A1 | 7/2010 | |
| WO | 2013/087878 A1 | 6/2013 | |

OTHER PUBLICATIONS

English langauge translation of JP 2014-065881, pp. 1-14, Jun. 7, 2022.*
International Search Report dated Nov. 22, 2017, in corresponding PCT/JP2017/035165 (2 pages).
S. Brunauer, et al., "Adsorption of Gases in Multimolecular Layers", J. Am. Chem. Soc., vol. 60, pp. 309-319 (1938).
Database WPI week 200465 Thomson Scientific, London, GB; AN 2004-665854 XP002802558.
Database WPI week 201381 Thomson Scientific, London, GB; AN 2013-J73566 XP002802559.

* cited by examiner

Cross section II-II

TIRE COMPRISING A RUBBER COMPOSITION

TECHNICAL FIELD

The field of the invention is the control of the presence or not of a specific composition within a tire.

BACKGROUND ART

Most of the modern tires comprise several portions, each portion comprises each rubber composition according to the function of portion, and each rubber composition is different from the others, but each portion comprises more or less content of carbon black as a black pigmentation agent in order to let the tire users feel a sense of unity as the whole tire as much as possible to reduce an occurrence of discontinuity of colors among the several portions.

While, the tire manufactures desire each portion to have a visual discrimination property in order to confirm whether each portion is suitably arranged in the tire.

SUMMARY OF INVENTION

Technical Problem

During their research, the inventor has discovered that a specific rubber composition for a tire has a visual discrimination property in a special condition, specifically upon exposure to ultraviolet irradiation in a dark place, with maintaining a sense of unity of the tire in an ordinary condition, specifically in a bright place.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

As a tire has a geometry of revolution about an axis of rotation, the geometry of the tire is generally described in a meridian plane containing the axis of rotation of the tire, and the following definitions of directions of the tire are understood in the present application:

A radial direction is a direction perpendicular to the axis of rotation of the tire;

An axial direction is a direction parallel to the axis of rotation of the tire;

A circumferential direction is a direction perpendicular to the meridian plane.

A plane being perpendicular to the axis of rotation of the tire and passing through the middle of a tread surface of the tire is referred to as an equatorial plane of the tire.

In what follows, expressions "radially", "axially" and "circumferentially" respectively mean "in the radial direction", "in the axial direction" and "in the circumferential direction". Expressions "radially on the inside (radially inner or radially internal), or respectively radially on the outside (radially outer or radially external)" mean "closer or, respectively, further away, from the axis of rotation of the tire, in the radial direction, than". Expressions "axially on the inside (axially inner or axially interior) or respectively axially on the outside (axially outer or axially exterior)" mean "closer or, respectively further away, from the equatorial plane, in the axial direction, than". Respective dimensions of a given element in the radial, axial and circumferential directions will also be denoted "radial thickness or height", "axial width" and "circumferential length" of this element. Expression "laterally" mean "in the circumferential or axial direction".

Solution to Problem

A first aspect of the invention is a tire comprising a fluorescent rubber composition based on at least: an elastomer matrix; a reinforcing filler comprising between 0 and 50 phr, preferably between 0 and 40 phr, more preferably between 0 and 30 phr, still more preferably between 0 and 20 phr, of carbon black; and between 2.5 and 15 phr of a fluorescent pigment.

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Advantageous Effects of Invention

The specific rubber composition has the visual discrimination property in the special condition, specifically upon exposure to ultraviolet irradiation in a dark place, with maintaining the sense of unity of the tire in the ordinary condition except the special one.

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the"vinyltoluene" commercial mixture, para-(tert-butyl) styrene, methoxy styrenes, chlorostyrenes, vinylmesitylene, divinylbenzene or vinylnaphthalene.

A second aspect of the invention is the tire according to the first aspect, wherein the elastomer matrix comprises at least one diene elastomer selected from the group consisting of polybutadienes (BRs), synthetic polyisoprenes (IRs), natural rubber (NR), butadiene copolymers, isoprene copolymers and the mixtures thereof; such copolymers are selected more preferably from the group consisting of butadiene-styrene copolymers (SBRs) and the mixtures thereof.

The diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution. This elastomer may be coupled and/or star-branched or else functionalized with a coupling and/or star-branching or functionalizing agent.

According to a preferred embodiment of the second aspect, the elastomer matrix may comprise more than 50 phr, preferably more than 60 phr, more preferably more than 70 phr, still more preferably more than 80 phr, particularly more than 90 phr, more par ticularly 100 phr, of a first diene elastomer which is a styrene-butadiene copolymer, advantageously a solution styrene-butadiene copolymer, and optionally comprising 0 to less than 50 phr, preferably less than 40 phr, more preferably less than 30 phr, still more preferably less than 20 phr, particularly less than 10 phr, of a second diene elastomer which is different from the first diene elastomer, which means the elastomer matrix comprises no second diene elastomer or comprises less than 50 phr, preferably less than 40 phr, more preferably less than 30 phr, still more preferably less than 20 phr, particularly less than 10 phr, of the second diene elastomer.

The rubber composition of the tire according to the invention is based on a reinforcing filler.

Use may be made of any type of reinforcing filler known for its capabilities of reinforcing a rubber composition which can be used for the manufacture of tires, for example an organic filler, such as carbon black, and in additional, a reinforcing inorganic filler, such as silica, with which a coupling agent is combined in a known way. Preferably, the reinforcing filler may predominately comprise the reinforcing inorganic filler.

The reinforcing filler in the rubber composition of the tire according the invention comprises between 0 and 50 phr, preferably between 0 and 40 phr, more preferably between 0 and 30 phr, still more preferably between 0 and 20 phr, of carbon black.

As carbon blacks, all carbon backs conventionally used in tires ("tire-grade" blacks) are suitable, such as for example reinforcing carbon blacks of the 100, 200 or 300 series in ASTM grades (such as for example, the N115, N134, N234, N326, N330, N339, N347 or N375 blacks), or carbon blacks higher series, the 500, 600, 700 or 800 series in ASTM grades (such as for example the N550, N660, N683, N772, N774 blacks). The carbon blacks might for example be already incorporated in an elastomer matrix, for instance, a diene elastomer, in the form of a masterbatch (see for example applications WO 97/36724 or WO 99/16600).

Within each of the aforementioned ranges of content of carbon black in the rubber composition, there is a benefit of coloring properties (black pigmentation agent) and anti-UV properties of carbon blacks, without furthermore adversely affecting the typical performance provided by the reinforcing inorganic filler, namely high grip and/or low hysteresis loss.

A third aspect of the invention is the tire according to the first or the second aspect, wherein the reinforcing filler comprises between 0 and 10 phr, preferably between 0.5 and 7.0 phr, more preferably from 1.0 to 5.0 phr, of carbon black.

A fourth aspect of the invention is the tire according to any one of the first to the third aspects, wherein the reinforcing filler comprises more than 40 phr (for example, between 40 and 200 phr), preferably more than 50 phr (for example, between 50 and 190 phr), more preferably more than 60 phr (for example, between 60 and 180 phr), still more preferably more than 70 phr (for example, between 70 and 170 phr), still more preferably more than 80 phr (for example, between 80 and 160 phr), particularly more than 90 phr (for example, between 90 and 150 phr), more particularly more than 100 phr (for example, between 100 and 140 phr), still more particularly at least 110 phr (for example, from 110 to 130 phr), of a reinforcing inorganic filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

A fifth aspect of the invention is the tire according to the fourth aspect, wherein the reinforcing inorganic filler predominately comprises silica, that is, the reinforcing inorganic filler comprises more than 50% by weight of silica per 100% by weight of the reinforcing inorganic filler. Preferably, the reinforcing inorganic filler may comprise 100% by weight, of silica per 100% by weight of the reinforcing inorganic filler. The silica may be a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

According to a preferred embodiment of the invention, in case of that the reinforcing filler may comprise the reinforcing inorganic filler, particularly in case of that it is silica, may have a BET surface area and a CTAB specific surface area that are advantageously 50 to 350 $m^2/g$, more advantageously 100 to 300 $m^2/g$, still more preferably between 150 and 250 $m^2/g$.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

(I)Z-A-Sx-A-Z, in which:       formula (I):

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

[Chem. 1]

in which:

the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl), the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_2O)_3Si(CH_2)_3S_2]_2$, or bis(3-triethoxysilylpropyl)disulphide, abbreviated to TESPD, of formula $[(C_2HSO)_3 Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane poly-sulphide, of bifunctional POSs (polyorganosiloxanes) or of hydroxysilane polysulphides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to a preferred embodiment of the invention, the content of coupling agent may be from 0.5 to 15% by weight per 100% by weight of the reinforcing inorganic filler, particularly silica.

According to a preferred embodiment of the invention, the rubber composition in the tire according to the invention may be based on less than 30 phr (for example, between 0.1 and 30 phr), preferably less than 25 phr (for example, between 0.5 and 25 phr), more preferably less than 20 phr (for example, between 1 and 20 phr), still more preferably less than 15 phr (for example, between 1.5 and 15 phr) of coupling agent.

The rubber composition in the tire according to the invention is based on a between 2.5 and 15 phr of a fluorescent pigment.

The fluorescent pigment fluoresces upon exposure to invisible region light irradiation, especially to ultraviolet irradiation (for example, by an UV lamp, generally called black light), even though in a dark place. That means the fluorescent pigment absorbs light in invisible region, especially in ultraviolet region (usually, 10 to 380 nm), of the electromagnetic spectrum, and re-emits light in visible region (usually, 380 to 800 nm) by fluorescence.

A sixth aspect of the invention is the tire according to any one of the first to the fifth aspects, wherein the rubber composition is based on between 2.5 and 10 phr, preferably between 2.5 and 7.0 phr, more preferably from 3.0 to 5.0 phr, of a fluorescent pigment.

A seventh aspect of the invention is the tire according to any one of the first to the sixth aspects, wherein the ratio of the content of fluorescent pigment to that of carbon black is between 0.5 and 10, preferably between 0.8 and 8, more preferably from 1 to 5.

An eighth aspect of the invention is the tire according to any one of the first to the seventh aspects, wherein the fluorescent pigment is selected from the group consisting of at least one organic fluorescent pigment, at least one inorganic fluorescent pigment and the mixtures thereof.

A ninth aspect of the invention is the tire according to the eighth aspect, wherein the fluorescent pigment is selected from the group consisting of at least one organic fluorescent pigment and the mixtures thereof.

A tenth aspect of the invention is the tire according to the eighth or the ninth aspect, wherein the organic fluorescent pigment comprises at least one organic fluorescent dye and at least one resin, also called base resin (for example, synthetic resin).

The organic fluorescent pigment may have more excellent durability (for example, light resistance, chemical resistance, and/or heat resistance) than that of the organic fluorescent dye itself. The organic fluorescent may be, for example, obtained by solid-soluting the organic fluorescent dye into the base resin, and then by milling the solid solution. Preferably, the organic fluorescent pigment may be practically insoluble in water and oil, more preferably insoluble in water and oil.

An eleventh aspect of the invention is the tire according to the tenth aspect, wherein the organic fluorescent dye comprises at least one dye selected from the group consisting of an acid dye(s), a basic dye(s), a disperse dye(s) and the mixtures thereof.

The acid dye, the basic dye and the disperse dye may have higher dyebility in a polymer compound and more excellent compatibility with the compound than the other organic fluorescent dye.

Although it is not especially limited, the acid dye, the basic dye, and the disperse dye are cited with color index number as follows.

As the acid dye, ACID YELLOW 3, 7; ACID RED 52, 77, 87, 92; ACID BLUE 9;

may be used, and are preferably chosen in the group consisting of this list.

As the basic dye, BASIC YELLOW 1, 40; BASIC ORANGE 14, 22; BASIC RED 1, 13; BASIC VIOLET 7, 10, 110; BASIC BLUE: 7, BASIC GREEN: 1 may be used, and are preferably chosen in the group consisting of this list.

As the disperse dye, DISPERSE YELLOW 82, 121, 124, 184:1, 186, 199, 216;

DISPERSE ORANGE 11; DISPERSE RED 58, 239, 240, 345, 362, 364; DISPERSE BLUE 7, 56, 183, 155, 354, 365; DISPERSE VIOLET 26, 27, 28, 35, 38, 46, 48, 57, 63, 77, 97; may be used, and are preferably chosen in the group consisting of this list.

A twelfth aspect of the invention is the tire according to the eleventh aspect, wherein the organic fluorescent dye further comprises a fluorescent whitening agent.

According to a preferred embodiment of the twelfth aspect, the fluorescent organic fluorescent dye may minorly comprise the fluorescent whitening agent, that is, the fluorescent organic fluorescent dye may comprise less than 50% by weight of the fluorescent whitening agent per 100% by weight of the fluorescent organic fluorescent.

The fluorescent whitening agent, which absorbs light in the ultraviolet region (usually, 330 to 380 nm) of the electromagnetic spectrum, and re-emits light in the blue region (usually, 400 to 450 nm) by fluorescence, can be used as a discoloration preventing agent, especially in an external rubber composition, for example a rubber composition in a tire tread and/or a tire sidewall(s) as mentioned in JP 2014-65879, JP 2014-65880 and JP 2014-65881. Therefore, it is preferable that the organic fluorescent pigment comprises the organic fluorescent dye(s) other than fluorescent whitening agent, and the fluorescent whitening agent in order to improve the visual discrimination property of tire portion(s) in parallel to improve the preventive of discoloration.

Although it is not especially limited, as the fluorescent whitening agent, FLUORESCENT BRIGHTENING AGENT 54, 135, 162, 260; may be cited with color index number, such fluorescent whitening agent being preferably chosen in the group consisting of this list.

According to a preferred of the eleventh or the twelfth aspect, the organic fluorescent dye further comprises at least one dye selected from the group consisting of an oil-soluble dye, a direct dye and the mixtures thereof.

Although it is not especially limited, the oil-soluble dye and the direct dye are cited with color index number as follows.

As the oil-soluble dye, SOLVENT YELLOW 44; SOLVENT ORANGE 5, 55;

SOLVENT RED 49, 149, 150; SOLVENT BLUE 5; SOLVENT GREEN 7; may be cited, and are preferably chosen in the group consisting of this list.

As the direct dye, DIRECT YELLOW 85; DIRECT ORANGE 8, 9; DIRECT BLUE 22; DIRECT GREEN 6; may be cited, and are preferably chosen in the group consisting of this list.

According to a preferred embodiment of any one of the tenth to the twelfth aspect, the resin, that is the base resin, in the organic fluorescent pigment may be made at least one synthetic resin selected from the group consisting of melamine resin, aromatic sulfonamide resin, olefin class resin, acrylic resin, and the mixtures thereof, preferably selected from the group consisting of olefin class resin, acrylic resin, and the mixtures thereof. More preferably the base resin in the organic fluorescent pigment is selected from the group consisting of acrylic resin, and the mixtures thereof, because they are formaldehyde free.

The organic pigment is available commercially, for example, FX-300 series, SX-1000 series, and SX-100 series as provided by Shinloihi Co., Ltd.

A thirteenth aspect of the invention is the tire according to the eighth aspect, wherein the fluorescent pigment is selected from the group consisting of an inorganic fluorescent pigment(s) and the mixtures thereof.

The inorganic fluorescent pigment(s) may comprise a base metal compound(s) and the activator(s). The base metal compound(s) is preferably selected from the group consisting of ZnS:Ag; Sr(PO$_4$)$_3$Cl:Eu; 3(Ba, Mg)O.8Al$_2$O$_3$:Eu; ZnO:Zn; ZnS:Ag,Al; (SrCaBaMg)$_5$(PO$_4$)$_3$Cl:Eu; BaMgAl$_{10}$O$_{17}$:Eu; CaWO$_4$; Sr$_4$Al$_{14}$O$_{25}$; Zn$_2$SiO$_4$:Mn; Zn$_2$GeO$_4$:Mn; ZnS:Cu; ZnS:Mn; ZnS:Cu,Al; LaPO$_4$:Ce,Tb; Gd$_2$O$_2$S:Tb; SrAl$_2$O$_4$; (ZnCd)S:Cu; (ZnCd)S:Ag; Cd$_2$B$_2$O$_5$:Mn; (SrMg)$_3$(PO$_4$)$_2$:Mn; Y$_2$O$_3$:Eu; YVO$_3$:En; Y(P, V)O$_4$:Eu; Y$_2$O$_2$S:Eu; (Y, Gd)BO$_3$; 0.5MgF$_2$.3.5MgO.GeO$_2$:Mn; Ca$_{10}$(PO$_4$)$_6$ FCl:Sb,Mn and the mixtures thereof.

The rubber composition(s) of the tire(s) according to the invention may be based on all or a portion(s) of the usual additives generally used in the elastomer compositions for tires, such as, for example, protection agents, such as antiozone waxes, chemical antiozonants, antioxidants, plasticizing agent, tackifying resins, methylene acceptors (for example phenolic novolak resin) or methylene donors (for example HMT or H3M hexamethylenetetramine (HMT) or hexamethoxymethylmelamine (H3M)), a crosslinking system based either on sulphur or on donors of sulphur and/or peroxide and/or bismaleimides, vulcanization accelerators, or vulcanization activators.

A fourteenth aspect of the invention is the tire according to any one of the first to the thirteenth aspects, wherein the rubber composition is further based on a plasticizing agent, preferably selected from the group consisting of liquid plasticizer(s), hydrocarbon resin(s) and the mixtures thereof.

According to a preferred embodiment of the fourteenth aspect, the plasticizing agent may comprise between 0 and 100 phr, preferably between 0 and 90 phr, more preferably between 0 and 80 phr, still more preferably between 0 and 70 phr, particularly between 5 and 60 phr, more particularly from 10 to 50 phr, of the liquid plasticizer(s).

Any extending oil, whether of aromatic or non-aromatic nature, any liquid plasticizing agent known for its plasticizing properties with regard to elastomer matrix(es), for instance, diene elastomers, can be used as the liquid plasticizer(s) to soften the matrix by diluting the elastomer and the reinforcing filler. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

According to a preferred embodiment of the fourteenth aspect, the liquid plasticizer(s) are selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof, preferably selected from the group consisting of MES oils, TDAE oils, naphthenic oils, vegetable oils and the mixtures thereof.

According to a preferred embodiment of the fourteenth aspect, the plasticizing agent may comprise between 0 and 100 phr, preferably between 0 and 90 phr, more preferably between 0 and 80 phr, still more preferably between 0 and 70 phr, particularly between 5 and 60 phr, more particularly from 10 to 50 phr, of the hydrocarbon resin(s).

The hydrocarbon resin(s) are polymer well known by a person skilled in the art, which are essentially based on carbon and hydrogen, and thus miscible by nature in rubber composition(s), for instance, diene elastomer composition (s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:

a Tg$_{DSC}$ of above 20° C. (for example, between 20° C. and 100° C.), preferably above 30° C. (for example, between 30° C. and 100° C.), more preferably above 40° C. (for example, between 40° C. and 100° C.), still more preferably above 45° C. (for example, between 45° C. and 100° C.), particularly at least 50° C. (for example, at least 50° C. and less than 100° C.);

a number-average molecular weight (Mn) of between 400 and 2000 g/mol (more preferably between 500 and 1500 g/mol);

a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a preferred embodiment of the fourteenth aspect, the hydrocarbon resin(s) are selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, C$_5$ fraction homopolymer or copolymer resins, C$_9$ fraction homopolymer or copolymer resins, alpha-methyl styrene homopolymer or copolymer resins and the mixtures thereof. Use is more preferably made, among the above copolymer resins, of those selected from the group consisting of (D)CPD/ vinylaromatic copolymer resins, (D)CPD/terpene copolymer resins, (D)CPD/C$_5$ fraction copolymer resins, (D)CPD/C$_9$ fraction copolymer resins, terpene/vinylaromatic copolymer resins, terpene/phenol copolymer resins, C$_5$ fraction/vinyl-aromatic copolymer resins, C$_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a C$_9$ fraction (or more generally from a C$_8$ to C$_{10}$ fraction) are suitable, for example, as vinylaromatic monomer. Preferably, the vinylaromatic compound is styrene or a vinylaromatic monomer resulting from a C$_9$ fraction (or more generally from a C$_8$ to C$_{10}$ fraction). Preferably, the vinylaromatic compound is the minor monomer, expressed as molar fraction, in the copolymer under consideration.

The preferred resins above are well known to a person skilled in the art and are commercially available, for example:

polylimonene resins: by DRT under the name "Dercolyte L120" (Mn=625 g/mol; Mw=1010 g/mol; PI=1.6; Tg$_{DSC}$=72° C.) or by Arizona Chemical Company under the name "Sylvagum TR7125C" (Mn=630 g/mol; Mw=950 g/mol; PI=1.5; Tg$_{DSC}$=70° C.);

C$_5$ fraction/vinylaromatic, notably C$_5$ fraction/styrene or C$_5$ fraction/C$_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373"; limonene/styrene copolymer resins: by DRT under the name "Dercolyte TS 105" or by Arizona Chemical Company under the names "ZT115LT" and "ZT5100".

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; Tg$_{DSC}$=53° C.); "Sylvares SA 120" (Mn=1030 g/mol; PI=1.9; Tg$_{DSC}$=64° C.); "Sylvares 540" (Mn=620 g/mol; PI=1.3; Tg$_{DSC}$=36° C.; hydroxyl number=56 mg KOH/g); and "Sylvares 600" (Mn=850 g/mol; PI=1.4; Tg$_{DSC}$=50° C.; hydroxyl number=31 mg KOH/g).

According to a preferred embodiment of the fourteenth aspect, the total content of plasticizing agent may be between 30 and 100 phr, preferably between 40 and 90 phr, more preferably between 50 and 80 phr, still more preferably from 60 to 70 phr.

These compositions can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The rubber compositions of the tires according to the invention may be manufactured in appropriate mixers using two successive preparation phases well known to a person skilled in the art: a first phase of thermomechanical working or kneading (referred to a as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

incorporating in the elastomer matrix, for instance, the diene elastomer(s), in a mixer, the reinforcing filler and the fluorescent pigment during a first stage ("non productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), a crosslinking system;

kneading everything up to a maximum temperature of less than 110° C.;

extruding or calendering the rubber composition thus obtained, in particular in the form of a portion of a tire.

By way of example, the first (non-productive) phase is carried out in a single thermomechanical mechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 10.0 phr, and that of the primary accelerator is preferably between 0.5 and 5.0 phr.

Use may be made, as accelerator (primary or secondary) of any compound capable of acting as accelerator of the vulcanization of elastomer matrix, for instance, diene elastomers, in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cy-clohexyl-2-benzothiazole sulphenamide (abbreviated to "CBS"), N,N-dicyclohexyl-2 benzothiazole-sulphenamide ("DCBS"), N-ter't-butyl-2-ben zothiazolesulphenamide ("TBBS"), N-tert-butyl-2 benzothiazolesulphenimide ("TBSI"), zinc dibenzyldithio-carbamate ("ZBEC"), Tetrabenzylthiuram disulfide ("TBZTD") and the mixtures thereof.

The final composition thus obtained is subsequently calendered, for example in the form of a sheet or of a plaque, in particular for laboratory characterization, or else extruded in the form of a rubber profiled element which can be used directly as a portion of a tire.

The vulcanization (or curing) is carried out in a known way at a temperature generally of between 110° C. and 190° C. for a sufficient time which can vary, for example, between 5 and 90 min depending in particular on the curing temperature, the vulcanization system adopted and the vulcanization kinetics of the composition under consideration.

The invention relates to the rubber compositions in the raw state (i.e., before curing) and in the cured state (i.e., after cros slinking or vulcanization).

A fifteenth aspect of the invention is the tire according to any one of the first to the fourteenth aspects, wherein the fluorescent rubber composition is an external rubber composition.

A sixteenth aspect of the invention is the tire according to the fifteenth aspect, wherein the fluorescent external rubber composition is comprised in a tread of the tire and/or a sidewall(s) of the tire.

A seventeenth aspect of the invention is the tire according to the sixteenth aspect, wherein the fluorescent external rubber composition is comprised in the tread of the tire.

An eighteenth aspect of the invention is the tire according to the seventeenth aspect, wherein the tread of the tire comprises a plurality of tread pattern elements (1) delimited by cut-outs (3, 4) (grooves with an average width of greater than or equal to 2 mm and/or sipes (incisions), with an average width of less than 2 mm); the tread pattern elements (1) respectively comprising at least one lateral face (13, 14, 15, 16) and a contact surface (2) intended to come into contact with the ground during rolling; the tread pattern elements (1) respectively comprising a first rubber composition (FC) at least partially covered on at least one of the lateral face with a layer of a second rubber composition (SC) which is different from the first rubber composition (FC), the tire, being characterized in that the first rubber composition (FC) or the second rubber composition (SC) is the fluorescent external rubber composition.

There are generally two types of the tread pattern elements. One is called as "block(s)" delimited by circumferential or axial groove(s), and the axial groove(s) is open to both sides of the circumferential grooves. Another is called as "rib(s)" delimited by circumferential groove(s) (optionally, and axial one(s)), and the axial groove(s) is not open to both sides of the circumferential grooves. Moreover, the tread pattern elements may comprise one or more sipes to form additional edge corners.

A nineteenth aspect of the invention is the tire according to the eighteenth aspect, wherein the second rubber composition (SC) is the fluorescent external rubber composition.

BRIEF DESCRIPTION OF DRAWINGS

Other characteristics and advantages of the eighteenth or the nineteenth aspect arise from the description made hereafter in reference to the annexed drawings which schematically show (in particular not to a specific scale), as nonrestrictive examples, of the embodiments of the object of the invention.

In these drawings.

DESCRIPTION OF EMBODIMENTS

Figure 1:
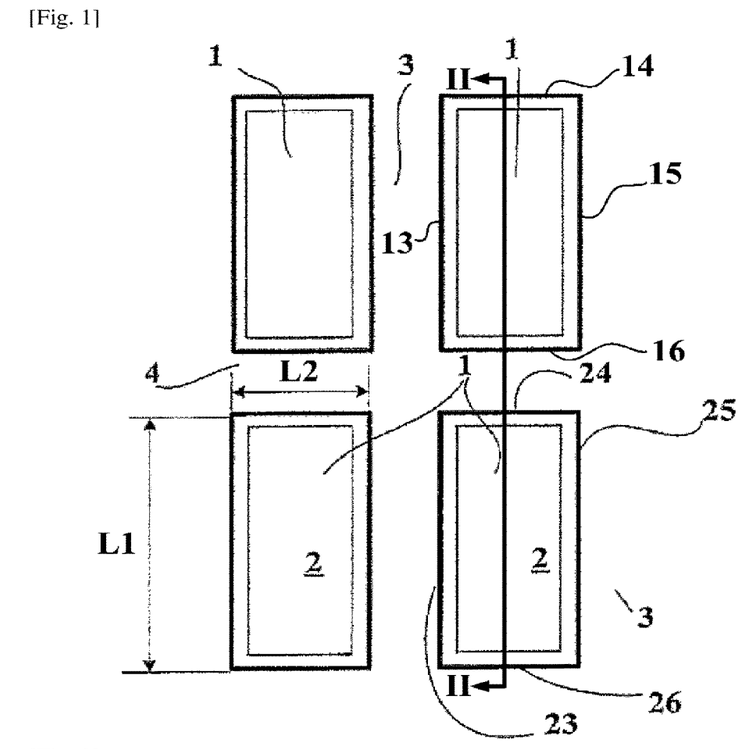
FIG. 1 depicts a partial plan view of blocks as tread pattern elements (1) of a tread of a tire according to the eighteenth or the nineteenth aspect.

The annexed FIG. 1 represents a partial plan view of four rectangular blocks as a plurality of tread pattern elements (1) of a tread of a tire according to the eighteenth or the nineteenth. Each of the blocks is delimited by cut-outs (3, 4). The cut-outs are grooves (3) circumferentially extending and the other grooves (4) axially extending. Each of the blocks comprises four lateral faces (13, 14, 15, 16) and a contact surface (2) intended to come into contact with ground during the tire rolling. Each of the blocks has a length (L1) on a circumferential direction of the tire, and a width (L2) on an axial direction of the tire. Intersections of the lateral faces (13, 14, 15, 16) with the contact surface (2) form four edge corners (23, 24, 25, 26) which play important portions when driving particularly on a slippery road surface, notably through the presence of water, snow or ice.

Figure 2:
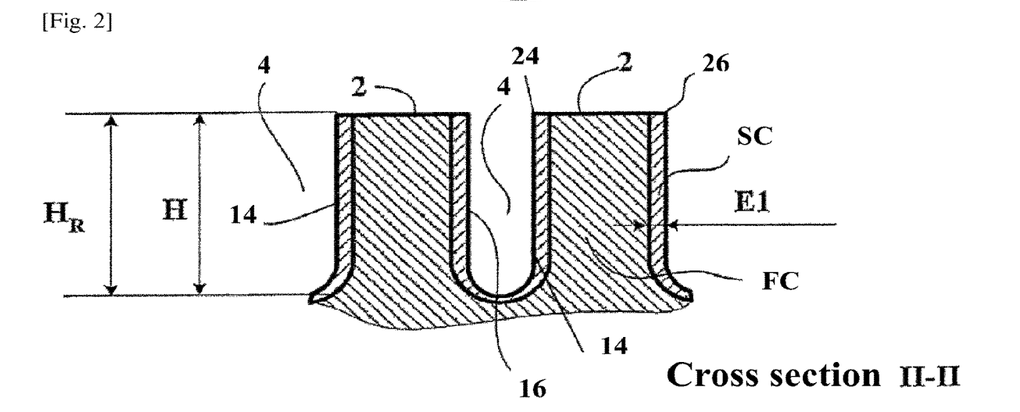
FIG. 2 shows the blocks of FIG. 1 in the cross section on the line of section mil.

The FIG. 2 presents the two blocks in the cross section taken along the line of section II-II of FIG. 1. The cross section is perpendicular to the axial direction of the tire.

In these figures, each of the blocks comprises a first rubber composition (FC: a mixture of base material), completely in this case, covered with a layer of a second rubber composition (SC: a mixture of covering material or a covering composition) on the four lateral faces (13, 14, 15, 16) bounding the grooves (3, 4) circumferentially (3) or axially extending (3, 4). The second rubber composition (SC) is different from the first rubber composition (FC). The first rubber composition (FC) or the second rubber composition is the fluorescent external rubber composition of the tire according to the fourteenth aspect. The layer of the second rubber composition (SC) has a thickness (E1) that is substantially constant (over an entire height (Hr) of covering, in this instance equal to a depth (H) of the grooves). Then, the depth (H) of the grooves is equal to a height of the blocks.

According to a preferred embodiment of the eighteenth or the nineteenth aspect, the lateral faces (14, 16, 24, 26) have orientations which are perpendicular to the circumferential direction of the tire, preferably the layer of the second rubber composition (SC) covers on the lateral faces (14, 16, 24, 26) which have orientations which are perpendicular to the circumferential direction of the tire in order to allow an excellent grip performance(s) on several grounds (for example, wet, snowy and/or icy grounds).

According to a preferred embodiment of the eighteenth or the nineteenth aspect, the second rubber composition extends, in a new condition of the tire, as far as the edge corners (23, 24, 25, 26) formed by a boundary between the contact surface (2) and the lateral faces (13, 14, 15, 16) of the tread pattern elements (1).

According to a preferred embodiment of the eighteenth or the nineteenth aspect, the thickness (E1) is more than 0.1 mm (for example, between 0.1 and 5.0 mm), preferably more than 0.2 mm (for example, between 0.2 and 4.5 mm). More preferably, the thickness is between 0.2 and 4.0 mm, still more preferably between 0.3 and 1.0 mm in order to compromise and/or to improve grip performances on several grounds (for example, wet, snowy and/or icy grounds).

A first step in a manufacture of the tread of the tire according to the eighteenth or the nineteenth aspect is to cover the first rubber composition (FC) with the layer of the second rubber composition (SC).

For example, the first step can be done with a method described in the aforementioned application WO 2013/087878, namely by impregnating a two-dimensional fiber assembly such a fabric or non-woven, or a three-dimensional fiber assembly as a felt, previously placed in the appropriate dimensions, with the second rubber composition (SC). This impregnation can be done for example by hot calendering, by press molding or by injection under pressure.

The presence of the fiber assembly impregnated with the second rubber composition (SC), allows to obtain an excellent cohesion of the layer of the second rubber composition (SC) before vulcanization of the tire and thus assist the layer of the second rubber composition (SC) to place on the first rubber composition (FC) during molding of the tire.

Of course, means other than the fiber assembly could be used to improve the cohesion and the placement of the layer of the second rubber composition (SC) in the raw state, such as a rigid metal sheet, cellulose fiber (for instance, paper, cardboard) or another polymer.

Of course, if such a fiber assembly, strip or other means, is used to help the laying of the second rubber composition (SC) to place on the first rubber composition (FC) during the manufacture of the tire according to the seventeenth aspect, the second rubber composition (SC) can comprise the fiber assembly, the strip or the other means unless the fiber assembly, the strip or the other means is extracted before the curing of the tire.

Preferably, the fibers used are long fibers having a longest dimension of greater than 30 mm, more preferably of greater than 50 mm.

Any type of fibers, preferably fibers selected from the group consisting of textile fiber, mineral fiber and the mixtures thereof, can be used to the layer of the second rubber composition (SC) with sufficient tensile rigidity to facilitate the placement of layer of the second rubber composition during molding of the tire.

The textile fiber may be selected from the group consisting of natural origin fibers, synthetic fibers and the mixtures thereof. The natural origin fibers may be made at least one organic material selected from the group consisting of silk, cotton, bamboo, cellulose, wool and the mixtures thereof, preferably cotton, cellulose, wood and the mixtures thereof. The synthetic fibers may be made of at least one synthetic material selected from the group consisting of polyester, polyamide, carbon, aramid, polyethylene, polypropylene, polyacrylonitrile, polyimide, polysulfone, polyether sulfone, polyurethane, polyvinyl alcohol and the mixtures thereof.

The mineral fiber may be selected from the group consisting of glass fibers, basalt fiber and the mixtures thereof.

Then, one way of obtaining such a tread pattern is for example to cover the entirety of a green form of a tread comprising the first rubber composition (FC) with the layer of the second rubber composition (SC) of suitable thickness before molding the tread and the cut-outs. After molding, the second rubber composition (SC) on the contact surface (2) can be left in place or alternatively eliminated by a mechanical means (notably by grinding).

Another way of industrially producing a tread of a tire according to the eighteenth or nineteenth aspect may consist in applying, to the unvulcanized green form of the tire provided with a tread made of the first rubber composition (FC), thin strips of the second rubber composition (SC), as described in patent EP 0510550 (it is possible for the thin strips to be applied to the tread in the circumferential and/or axial direction(s)). Another way may consist in producing the tread by coextruding two (or more) compounds when the tread is extruded. It is still possible to operate as described in FIGS. 5-6 and paragraph IV-B of WO2013/087878.

After vulcanization of the tire of the eighteenth or nineteenth aspect, the specific layer of the second rubber composition (SC) described above has the advantage of providing a very suitable stiffness to the edges (23, 24, 25, 26) formed by the intersection of the contact surfaces (2) and the suitable rigidity lateral faces (13, 14, 15, 16), which is particularly favorable behavior of the tire on snowy ground, while giving the tire, thanks to the presence of the specific second rubber composition capable of compromising and/or improving grip performance(s) of the tire on several grounds (for example, wet, snowy and/or icy grounds).

According to a preferred embodiment of the nineteenth aspect, the first rubber composition (FC) can be a conventional rubber composition which may be based on at least one diene elastomer (typically 50 to 100 phr of a diene elastomer selected from the group consisting of natural rubber, synthetic polyisoprenes, polybutadienes, butadiene copolymers, isoprene copolymers and the mixtures thereof, and 0 to 50 phr of another diene elastomer), between 50 and 200 phr of a reinforcing filler (for instance, silica and/or carbon black), more than 30 phr of a plasticizing agent (for instance, liquid plasticizer(s), hydrocarbon resin(s) or the mixtures thereof) and a crosslinking system (not counting other usual additives).

The invention is further illustrated by the following non-limiting examples.

EXAMPLES

In the test, thirteen rubber compositions identified as T-0 to T-5 (a reference and comparative examples) and C-1 to C-7 (examples according to the invention) are compared. They are based on a diene elastomer (a SBR) reinforced with silica only or a blend of at silica and carbon black with/without a fluorescent pigment. The formulations of the thirteen rubber compositions, with the content of the various products expressed in phr, and visual discrimination property after curing are given at Table 1.

The reinforcing filler, its associated coupling agent, the fluorescent pigment, the elastomer matrix and the various other ingredient, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

The visual discrimination property test for the rubber compositions in comparison with the reference rubber composition (T-0) were conducted by ten expert tire inspectors in a dark room under ultraviolet irradiation with a black light (distance between each rubber composition and the black right was about 10 cm) and in a bright room.

The greater value of visual discrimination property for each rubber composition in Table 1 indicates the more inspectors visually discriminated between the rubber composition and the reference (T-0). It is decided that the rubber composition is acceptable when the value is more than 5 in the dark room, and less than 5 in the bright room.

The results from Table 1 demonstrate that each of the rubber compositions (C-1 to C-7) according to the invention has excellent visual discrimination property in the dark room under ultraviolet irradiation with the black light in parallel with excellent sense of unity with blackness originated from carbon black in the bright room, in comparison with the comparative examples (T-1 to T-5).

In conclusion, the rubber composition according to the invention has the visual discrimination property in a special condition, especially in a dark place under ultraviolet irradiation, with maintaining the sense of unity of the tire in an ordinary condition, especially in a bright place.

2. The tire according to claim 1, wherein the elastomer matrix comprises at least one diene elastomer selected from the group consisting of polybutadienes, synthetic polyisoprenes, natural rubber, butadiene copolymers, isoprene copolymers and mixtures thereof.

3. The tire according to claim 1, wherein the reinforcing filler predominantly comprises a reinforcing inorganic filler.

4. The tire according to claim 1, wherein the reinforcing filler comprises more than 40 phr of a reinforcing inorganic filler.

5. The tire according to claim 4, wherein the reinforcing inorganic filler predominantly comprises silica.

6. The tire according to claim 1, wherein a ratio of the content of fluorescent pigment to that of carbon black is between 0.5 and 10.

7. The tire according to claim 1, wherein the fluorescent pigment further comprises a fluorescent whitening agent.

8. The tire according to claim 1, wherein the fluorescent rubber composition further comprises a plasticizing agent selected from the group consisting of liquid plasticizers, hydrocarbon resins and mixtures thereof.

9. The tire according to claim 1, wherein the fluorescent rubber composition is an external rubber composition.

TABLE 1

| | T-0 | T-1 | T-2 | C-1 | C-2 | C-3 | C-4 | C-5 | C-6 | C-7 | T-3 | T-4 | T-5 |
|---|---|---|---|---|---|---|---|---|---|---|---|---|---|
| SBR (1) | 100 | 100 | 100 | 100 | 100 | 100 | 100 | 100 | 100 | 100 | 100 | 100 | 100 |
| Carbon black (2) | 5.0 | 5.0 | 5.0 | 5.0 | 5.0 | 4.0 | 3.0 | 2.0 | 1.0 | 7.0 | 50 | 5.0 | |
| Silica (3) | 120 | 120 | 120 | 120 | 120 | 120 | 120 | 120 | 120 | 120 | 120 | 120 | 120 |
| Coupling agent (4) | 9.6 | 9.6 | 9.6 | 9.6 | 9.6 | 9.6 | 9.6 | 9.6 | 9.6 | 9.6 | 9.6 | 9.6 | 9.6 |
| Fluorescent pigment (5) | | 1.0 | 2.0 | 3.0 | 5.0 | 5.0 | 5.0 | 5.0 | 5.0 | 5.0 | 5.0 | 25 | 5.0 |
| Hydrocarbon resin (6) | 20 | 20 | 20 | 20 | 20 | 20 | 20 | 20 | 20 | 20 | 20 | 20 | 20 |
| Liquid plasticizer (7) | 45 | 45 | 45 | 45 | 45 | 45 | 45 | 45 | 45 | 45 | 45 | 45 | 45 |
| Steric acid | 1 | 1 | 1 | 1 | 1 | 1 | 1 | 1 | 1 | 1 | 1 | 1 | 1 |
| Anti-ozone wax | 1.5 | 1.5 | 1.5 | 1.5 | 1.5 | 1.5 | 1.5 | 1.5 | 1.5 | 1.5 | 1.5 | 1.5 | 1.5 |
| Anti-oxidant (8) | 2 | 2 | 2 | 2 | 2 | 2 | 2 | 2 | 2 | 2 | 2 | 2 | 2 |
| DPG (9) | 3 | 3 | 3 | 3 | 3 | 3 | 3 | 3 | 3 | 3 | 3 | 3 | 3 |
| ZnO | 2.5 | 2.5 | 2.5 | 2.5 | 2.5 | 2.5 | 2.5 | 2.5 | 2.5 | 2.5 | 2.5 | 2.5 | 2.5 |
| Accelerator (10) | 2 | 2 | 2 | 2 | 2 | 2 | 2 | 2 | 2 | 2 | 2 | 2 | 2 |
| Sulphur | 1.7 | 1.7 | 1.7 | 1.7 | 1.7 | 1.7 | 1.7 | 1.7 | 1.7 | 1.7 | 1.7 | 1.7 | 1.7 |
| Visual discrimination property (11) | | | | | | | | | | | | | |
| Upon exposure to ultraviolet irradiation, in a dark room | — | 2 | 3 | 8 | 10 | 10 | 10 | 10 | 10 | 6 | 0 | 10 | 10 |
| In a bright room | — | 0 | 0 | 0 | 0 | 0 | 0 | 0 | 0 | 0 | 0 | 7 | 10 |

(1) SBR1: solution SBR with 44% of styrene units, 41% of 1,2- unit of the butadiene parts, and 23% of cis-1,4 unit of butadiene parts (Tg$_{DSC}$ = −12° C.);
(2) Carbon black: Carbon black (ASTM grade N234 from Cabot);
(3) Silica: Silica ("Zeosil 1165MP" from Rhodia (CTAB, BET: about 160 m$^2$/g));
(4) Coupling agent TESPT ("Si69" from Evonik);
(5) Fluorescent colored acrylic pigment (SINLOIHI COLOR SX-105 Lemon Yellow, S SINLOIHI)
(6) Cycloaliphatic hydrocarbon resins (ESCOREZ5600, Exxon mobil, Tg$_{DSC}$ = 52° C.);
(7) TDAE oil ("Vivatec 500" from the Hansen & Rosenthal company);
(8) N-(1,3-dimethylbutyl)-N-phenyl-para-phenylenediamine ("Santoflex 6-PPD" from Flexsys);
(9) Diphenylguanidine ("Perkacit DPG" from Flexsys);
(10) N-dicyclohexyl-2-benzothiazolesulphenamide ("Santocure CBS" from Flexsys).
(11) Visual discrimination property test in comparison with T-0, conducted by ten expert tire inspectors in a dark room under ultraviolet irradiation or in bright room.

The invention claimed is:

1. A tire comprising a fluorescent rubber composition based on at least:
   an elastomer matrix;
   a reinforcing filler comprising between 0 and 10 phr of carbon black; and
   between 2.5 and 7.0 phr of a fluorescent pigment, wherein the fluorescent pigment is a fluorescent colored acrylic pigment.

10. The tire according to claim 9, wherein a tread or a sidewall of the tire comprises the fluorescent external rubber composition.

11. The tire according to claim 10, wherein the tread comprises the fluorescent external rubber composition.

12. The tire according to claim 11, wherein the tread of the tire comprises a plurality of tread pattern elements delimited by cut-outs, the tread pattern elements respectively comprising at least one lateral face and a contact surface intended to come into contact with a ground during rolling, and the tread pattern elements respectively comprising a first rubber composition at least partially covered on the at least one lateral face with a layer of a second rubber composition which is different from the first rubber composition, and wherein the first rubber composition or the second rubber composition is the fluorescent external rubber composition.

13. The tire according to claim 12, wherein the second rubber composition is the fluorescent external rubber composition.

* * * * *